March 20, 1945. A. W. MORTON 2,372,103
SHAFT SEAL
Filed March 14, 1944
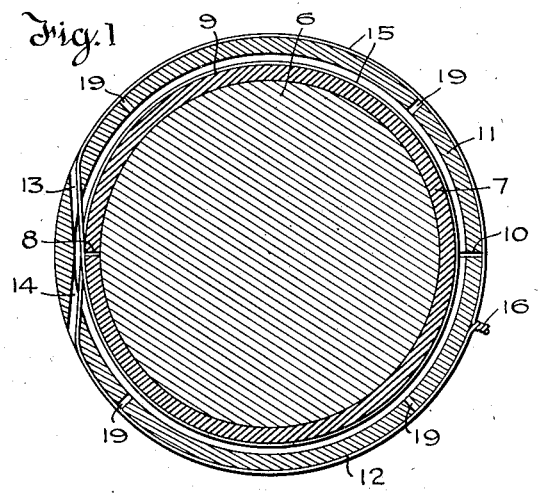
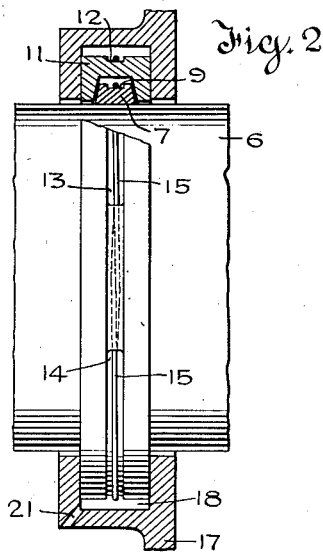
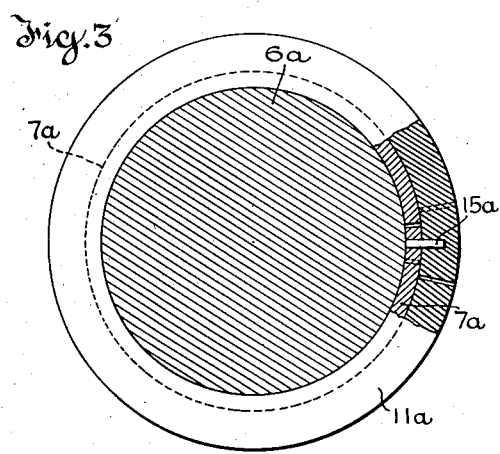
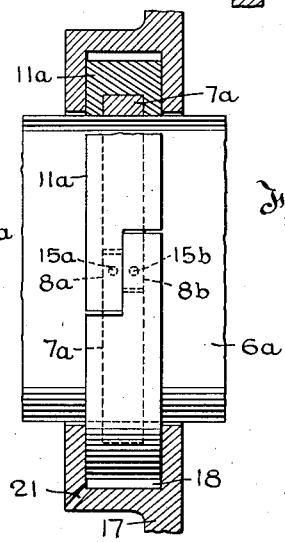
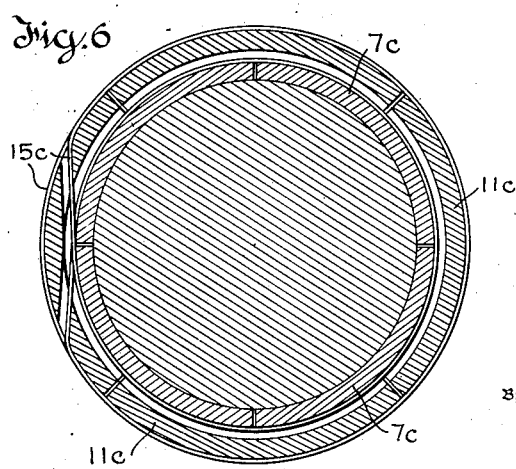
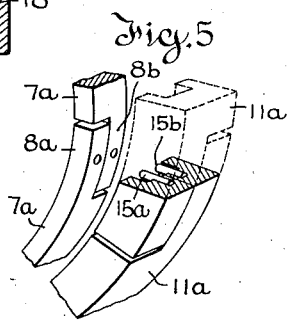
Inventor
Allen W. Morton
Attorneys

Patented Mar. 20, 1945

2,372,103

UNITED STATES PATENT OFFICE 2,372,103

SHAFT SEAL

Allen W. Morton, Baltimore, Md., assignor, by mesne assignments, to Koppers Company, Inc., a corporation of Delaware Application March 14, 1944, Serial No. 526,365

6 Claims. (Cl. 286—7)

This invention relates to shaft seals, that is to devices for resisting the leakage of fluid along a rotating shaft. The sealing element is a ring which embraces the shaft and which may be contracted into sealing contact with the shaft. While it is not strictly essential that the ring be constructed in one piece, the preferred construction involves the use of a split ring analogous to a piston ring but so arranged that it has a moderate contracting tendency upon the shaft. While the ring could be made of metal or of carbon, the contracting ring is preferably made of an oilproof plastic material such for example as some of the relatively hard plastics sold under the trade name Bakelite. The choice of material for this contracting ring is a matter of selection and depends upon the nature of the fluid to be arrested and on other similar factors.

It is desirable that the ring be shiftable on the shaft in the direction of the axis of the shaft, particularly for the purpose of permitting proper alinement while the shaft is at rest or while it is rotating at low speeds. As a rule when a shaft comes to speed its axial motion ends.

An important feature of the invention is the provision of centrifugal means acting to develop a contracting force on the sealing ring. The simplest form of centrifugal means is an expansible ring of substantial mass which preferably encircles and houses the contracting ring.

Two embodiments of the invention are illustrated in the accompanying drawing, in which Figure 1 is a section transverse to the shaft on the medial plane of the sealing unit.

Figure 2 is a view partly in elevation and partly in axial section showing the shaft and sealing unit of Figure 1 together with the confining unit with which the sealing assembly coacts.

Figure 3 is a view similar to Figure 1 showing a modified construction.

Figure 4 is a view similar to Figure 2 but showing the modified construction of Fig. 3.

Figure 5 is a fragmentary detail of the rings used in Figures 3 and 4 and indicating details of construction.

Figure 6 is a view similar to Fig. 1 showing a further modified construction.

Referring first to Figures 1 and 2 the shaft is indicated by the reference numeral 6. Encircling the shaft and in contact therewith is a contractible sealing ring 7. This ring in the form illustrated has a single gap or joint 8 which permits it to contract around the shaft 6. The cross section of the ring shown is trapezoidal as indicated in Figure 2 but it can be rectangular, square or of any suitable section, and the ring 7 is surrounded by a shallow peripheral groove 9. The ring 7 is preferably made of hard plastic material as above suggested and consequently is of relatively small mass so that its centrifugal tendency is slight. Encircling the ring 7 is an expansible ring 11 which is formed of some elastic material of substantial mass, for example steel or iron. The purpose is to produce a ring which may expand under the effect of centrifugal forces developed by rotation of the ring 11. The ring 11 has a gap 10 which in the assembled device is spaced approximately 180° from the gap 8 of the ring 7. Any suitable form of gap or joint may be employed in either the ring 7 or 11. The ring 11 has a groove on its interior face large enough to receive the ring 7 with slight clearance. The ring 11 is further provided with a circumferential shallow groove 12 and with two secant passages 13 and 14 which lead from the base of the groove 12 through the ring to the internal groove formed within the ring. A tension member 15 encircles each ring and forms a continuous band, the ends of the member 15 being spliced together as indicated at 16. They could be welded. Piano wire is a suitable material and also flat steel spring wire.

When the shaft 6 rotates, the ring 7 tends to rotate with it, and this entails rotation of the ring 11. The expansion of the ring 11 caused by centrifugal forces stresses the wire 15 in tension, and since this encircles the ring 7, the effect is to contract the ring 7 upon the shaft. This contraction tendency increases with the speed of rotation.

Seals of the type mentioned are used where a shaft passes through the wall of an oil retaining housing or extends away from a copiously lubricated bearing. In Figure 2 a portion of such a housing is indicated at 17. The housing is formed to provide an annular channel 18 which encircles the shaft and fits against the opposite faces of the ring 11. Thus the seal produced between the ring 11 and the sides of the channel 18 prevents leakage around and behind the ring 11. The contraction of the ring 7 upon the shaft prevents the passage of oil between the ring 7 and the shaft. Any oil which flows to the ring 7 is thrown by centrifugal force between the side of ring 7 and side of interior channel within the ring 11, and from this channel it flows to the space within the channel 18 outside the ring 11. The flow is partly through the passages 13 and 14 and partly through additional passages 19 in ring 11 which are provided for that purpose. Thus the seal picks up the oil and discharges it into that portion of the channel 18 which encircles the ring 11. From there it drains back to the housing or to any sump or collecting point through a passage or passages such as that indicated at 21. The effect is to produce a seal which arrests the oil and delivers it back either to the oil containing housing of the device or to any other collecting means.

The assembly comprising the ring 7, the ring 11 and the contracting wire or band 15 may take a number of specifically different forms, one of which is shown in Figures 3 to 5. In Figure 3 the shaft is indicated at 6a and the inner contracting ring is indicated at 7a. The outer ring which develops the centrifugal force is indicated at 11a. The gap in the ring 7a is of the stepped type so that it has narrow overlapping end portions 8a and 8b. The ring 11a has a reversely stepped gap which overlies the overlapping portions 8a and 8b of the ring 7a. Instead of the contracting wire 15 the connection between the two rings comprises a pin 15a projecting radially inward from one of the overlapping portions of ring 11a and another pin 15b projecting radially inward from the other overlapping portion of ring 11a. The construction of these pins is clearly shown in Figure 5. They are simply pins pressed into the outer ring. These pins engage in apertures formed in the portions 8a and 8b of the inner ring 7a. Thus a sort of cross connection is produced such that centrifugal expansion of the ring 11a entails contraction of the inner ring 7a.

The construction shown in Figures 3 to 5 is used in the same way and for the same purpose as the construction shown in Figures 1 and 2, and it is therefore unnecessary to elaborate details such as the parts 17, 18 and 21 which are unaffected by the change in design and are shown in substantially the form characteristic of Figure 2.

The modification shown in Fig. 6 is essentially similar to that shown in Figs. 1 and 2. The inner ring is made as arcuate sections 7c which may have step joints. Four such sections are indicated. Similarly the outer ring is shown as made in arcuate sections 11c, four of which are shown. A one piece outer ring such as the ring 11 of Fig. 1 could be used with a sectional inner ring such as the ring made up of the sections 7c (Fig. 6). In Fig. 6 the tension member is indicated as an endless band 15c of flat steel spring wire, arranged exactly as in Fig. 1.

The idea of the invention is not to produce what could be described as a gas-tight seal but to produce an oil arresting device which is free to move axially on the shaft when the shaft is not rotating but which seals itself to the shaft by centrifugal force as the shaft comes to speed and thereafter diverts any oil tending to leak along the shaft, returning that oil to the housing as already suggested.

Broadly considered the invention contemplates a contractible ring and centrifugally acting means rotating with that ring and serving to contract it into sealing engagement with the shaft upon which it is mounted.

What is claimed is:

1. In a shaft seal, the combination with a shaft of an encircling contractible ring adapted to close upon the shaft and rotate therewith; and centrifugal means arranged to rotate with said ring and serving to contract the ring upon the shaft.

2. In a shaft seal, the combination with a shaft of an encircling contractible ring adapted to close upon the shaft and rotate therewith; expansible means encircling said ring and having a greater centrifugal tendency than has the contractible ring; and means connecting said ring and said expansible means so that they rotate together, said means serving to convert the centrifugal tendency of said expansible means into a contracting reaction applied to said ring.

3. In a shaft seal, the combination with a shaft of an encircling contractible ring adapted to close upon the shaft and rotate therewith; an expansible ring encircling the contractible ring and having a centrifugal expansive tendency greater than that of the contractible ring; an endless band encircling each of said rings and arranged to translate the centrifugal expansive force reaction of the second named ring into a contracting force reaction applied to the first named ring; and means forming a channel within which said rings are housed and with which the expansible ring seals.

4. The combination defined in claim 3 in which each ring is continuous except for a single gap and the gaps of the two rings are approximately 180° apart.

5. In a shaft seal, the combination with a shaft of an encircling contractible ring adapted to close upon the shaft and rotate therewith; an expansible ring encircling the contractible ring and having a centrifugal expansive tendency greater than that of the contractible ring; an endless band encircling each of said rings and arranged to translate the centrifugal expansive force reaction of the second named ring into a contracting force reaction applied to the first named ring; means forming a channel within which said rings are housed and with which the expansible ring seals; and oil draining means leading from said channel.

6. In a shaft seal, the combination with a shaft of an encircling contractible split ring having gap-bridging end portions which lap one another; an expansible split ring encircling the contractible ring with its ends cross connected to the ends of the contractible ring, whereby expansion of the second ring contracts the first ring, the second ring having the larger centrifugal tendency; and means forming a seat with which the second ring seals.

ALLEN W. MORTON.